(12) United States Patent
Bidmead et al.

(10) Patent No.: US 12,240,592 B2
(45) Date of Patent: Mar. 4, 2025

(54) ACTUATOR

(71) Applicant: Airbus Operations Limited, Bristol (GB)

(72) Inventors: Ashley Bidmead, Bristol (GB); Florian Becher, Bristol (GB)

(73) Assignee: Airbus Operations Limited, Bristol (GB)

( * ) Notice: Subject to any disclaimer, the term of this patent is extended or adjusted under 35 U.S.C. 154(b) by 315 days.

(21) Appl. No.: 17/702,407

(22) Filed: Mar. 23, 2022

(65) Prior Publication Data
US 2022/0306287 A1    Sep. 29, 2022

(30) Foreign Application Priority Data
Mar. 24, 2021    (GB) ..................... 2104131

(51) Int. Cl.
*B64C 25/24*    (2006.01)
*B64C 1/14*     (2006.01)
*B64C 25/26*    (2006.01)

(52) U.S. Cl.
CPC ............ *B64C 25/24* (2013.01); *B64C 1/1415* (2013.01); *B64C 25/26* (2013.01)

(58) Field of Classification Search
CPC ....... B64C 25/24; B64C 1/1415; B64C 25/26; B64C 25/001; B64C 25/10;
(Continued)

(56) References Cited

U.S. PATENT DOCUMENTS 3,682,283 A * 8/1972 Sato ................. F16H 25/2021
                                                192/142 R
7,443,121 B2   10/2008 Nagai et al.
(Continued)

FOREIGN PATENT DOCUMENTS

CN       200989344      12/2007
EP       1 978 233      10/2008
(Continued)

OTHER PUBLICATIONS

Search Report for Application No. GB2104131.4 dated Sep. 3, 2021, 5 pages.
(Continued)

*Primary Examiner* — Medhat Badawi
*Assistant Examiner* — Vicente Rodriguez
(74) *Attorney, Agent, or Firm* — Nixon & Vanderhye P.C.

(57) ABSTRACT

An actuator is disclosed including an actuator body mounted for movement over a range of motion, the range of motion including a first part and a second part, the first part being the range of motion extending between an end position and the second part. The actuator includes a motor coupled to the actuator body to move the actuator body in the first direction and a controller configured to control the supply of current to drive the motor. The mechanical resistance to movement of the actuator body in the first direction is higher in the first part of the range of motion than in the second part of the range of motion. The controller is configured such that any additional current supplied to the motor when the actuator body is in the first part of the range of motion is limited thereby causing the speed of the actuator body to reduce as the actuator body approaches the end position.

14 Claims, 6 Drawing Sheets

(58) Field of Classification Search
CPC ......... F16H 2025/2075; F16H 25/2015; F15B 15/22; F16F 9/512; B64D 1/06
See application file for complete search history.

(56) References Cited

U.S. PATENT DOCUMENTS

| | | | |
|---|---|---|---|
| 8,360,397 B2 * | 1/2013 | Watanabe | F16H 25/2454 |
| | | | 254/98 |
| 2012/0235620 A1 * | 9/2012 | Babando | F15B 15/18 |
| | | | 318/461 |
| 2016/0053912 A1 | 2/2016 | Lenz et al. | |
| 2016/0348701 A1 * | 12/2016 | Marles | B64C 25/22 |
| 2022/0177118 A1 * | 6/2022 | Sharpe | F15D 1/0025 |

FOREIGN PATENT DOCUMENTS

| | | |
|---|---|---|
| EP | 3 254 954 | 12/2017 |
| JP | 59-99139 | 6/1984 |
| JP | 2004-328954 | 11/2004 |
| WO | 2021/047980 | 3/2021 |

OTHER PUBLICATIONS

Extended European Search Report for Application No. EP 22163610.3, 11 pages, dated Jul. 15, 2022.

* cited by examiner

ACTUATOR

CROSS RELATED APPLICATION

This application claims priority to United Kingdom Patent Application GB 2104131.4, filed Mar. 24, 2021, the entire contents of which is hereby incorporated by reference.

BACKGROUND OF THE INVENTION

The present disclosure relates to actuators, in particular electro-mechanical actuators, for use in aircraft.

The present invention concerns the damping of such actuators. More particularly, but not exclusively, this invention concerns an actuator configured such that increased mechanical resistance when approaching the end of the range of motion of the actuator results in a reduction of the speed of travel of the actuator. The invention concerns such an actuator, a landing gear including such an actuator, an aircraft including such an actuator and a method of operating such an actuator.

In aircraft, it is generally desirable to damp the movement of an actuator as it approaches the end of its range of motion, in order to prevent an abrupt stop generating excessive loads on the actuator and/or the structure to which it is attached. Such damping is common in hydraulic and hydro-mechanical actuators. For electro-mechanical actuators this damping is typically achieved using a sensor to detect the position of the actuator during extension and/or retraction and a speed controller which reduces the speed once the actuator has passed a predetermined position. Such a system is often inaccurate and can fail. Monitoring is often required to protect against loss of this damping function, but as well as increasing the cost and complexity of the actuator this often leads to false alarms and consequently operational interruptions and early scrapping of components and/or the need to be overly conservative and consequently slower actuator movement than is necessary. In one example solution a timer and position sensor are used to infer the speed of the actuator, but due to the inertia of the actuator the speed is not constant during over the range of movement of the actuator (e.g. there is an initial period of acceleration) and the resulting inaccuracy in estimation of speed gives false alarms and the actuator being slowed earlier than necessary in its movement. It would be advantageous to provide a more accurate and/or reliable solution to damping the movement of an actuator at the end of travel. Additionally or alternatively, it would be advantageous to provide a less complex and/or more cost effective solution to damping the movement of an actuator at the end of travel.

The present invention seeks to mitigate the above-mentioned problems. Alternatively or additionally, the present invention seeks to provide an improved actuator.

SUMMARY OF THE INVENTION

The present invention provides, according to a first aspect, an actuator comprising an actuator body, said body being mounted for movement over a range of motion in a first direction to an end position, the range of motion comprising a first part and a second part, the first part being the range of motion extending between the end position and the second part. The actuator may comprise a motor coupled to the actuator body to move the actuator body in the first direction; and/or a controller configured to control the supply of current to drive the motor, for example to control the supply of current to drive the motor at a target speed. It may be that the actuator is configured such that the mechanical resistance to movement of the actuator body in the first direction is higher in the first part of the range of motion than in the second part of the range of motion. It may be that the controller is configured such that any additional current supplied to the motor when the actuator body is in the first part of the range of motion is limited thereby causing the speed of the actuator body to reduce as the actuator body approaches the end position.

Thus, actuators in accordance with the present invention limit the current supplied to the motor when the actuator body approaches its end position while increasing the mechanical resistance to movement of said body and thereby damp the movement of the actuator body in an end region of its range of motion. Thus actuators in accordance with the present invention may allow for damping of actuator movement without the need to sense the position of the actuator body thereby increasing the reliability and/or reducing the cost and complexity of the actuator. Additionally or alternatively, actuators in accordance with the present invention may provide for more reliable and/or accurate damping because the location at which the mechanical resistance begins to increase is determined by the physical arrangement of the apparatus. Additionally or alternatively, actuators in accordance with the present invention may provide damping while being "fail-safe" in the sense that provided the increase in mechanical resistance is significant and the limits on the additional current are appropriately set, there is substantially no risk of a slow actuation of the actuator.

It will be appreciated that the additional mechanical resistance experienced in the first part of the range of motion gives rise to an additional torque on the motor, requiring additional power (i.e. additional current) to be supplied to the motor if the speed of the motor is to be maintained (power=torque×angular velocity). Further, the speed of the actuator body will be proportional to the speed of the motor, so by limiting the additional current supplied to the motor when experiencing the additional torque, the speed of the actuator body can be reduced in the region of the end of the range of motion.

Additional mechanical resistance may be defined as a force acting against movement of the actuator body in the first direction, said force being provided by a mechanical interaction of elements of the actuator. It may be that said additional mechanical resistance does not include changes in the force acting against movement of the actuator body in the first direction as a result of gravity (e.g. additional moment generated as the position of the actuator body changes).

The actuator body may be connected to the motor by a drive mechanism that converts the rotation of the motor into motion of the actuator body in the first direction. The drive mechanism may be configured such that additional force is required to move the actuator body in the first direction in the first part. Thus, the additional mechanical resistance may be provided as part of the drive mechanism. For example the resistance of the drive mechanism to movement by the motor may increase when the actuator body is in the first part of the range of motion as compared to the second part. Additionally or alternatively, the additional mechanical resistance may be provided a separate resistance mechanism, for example one or more resilient members and/or friction members arranged to resist movement of the actuator body in the first direction in the first part of the range of motion.

The controller may be configured to control the supply of current by switching the supply of current on or off. The controller may be configured to control the supply of current by varying the amount of current supply between different non-zero amounts. The controller may be configured to control the supply of current to drive the motor at a target speed. It may be that the actuator comprises one or more sensors arranged and configured to measure the speed of the motor. It may be that the actuator comprises one or more sensors arranged and configured to measure the speed of a part of the drive mechanism. It may be that said sensor(s) are connected to the controller. The controller may be configured to vary the current supplied to the motor in dependence on the signal so received in order to achieve a target speed of the motor. It may be that the controller is configured to provide sufficient current to drive the motor until the actuator body reaches the end position (e.g. to overcome the additional mechanical resistance in the first part of the range of motion).

It may be that the controller may be configured to control the supply of current only by switching the supply of current on or off. Thus, the controller may be configured such that no additional current is supplied to the motor when the actuator body is in the first part of the range of motion thereby causing the speed of the actuator body to reduce as the actuator body approaches the end position. Alternatively, where the controller is configured to control the supply of current by varying the amount of current supply between different non-zero amounts, the controller may be configured such that the additional current supplied to the motor when the actuator body is in the first part of the range of motion is limited thereby causing the speed of the actuator body to reduce as the actuator body approaches the end position. That is to say, the controller may be configured to supply additional current when the actuator body is in the first part of the range of motion.

It may be that the controller is configured to control the supply of current to drive the motor at a first target speed, for example in the second part of the range of motion. It may be that the controller is configured to limit the total current supplied when the actuator body is in the first part of the range of motion to less than that required to drive the motor at the first target speed.

It may be that the controller is configured to limit the current supplied to the motor by maintaining the current supplied below a first predetermined limit. It may be that the first predetermined limit is less than the current required to drive the motor at the first target speed when subject to the higher mechanical resistance. It will be appreciated that as the magnitude of the increase in resistance is known for any particular actuator it is straightforward for the skilled person to calculate a limit that will prevent the motor from overcoming the additional resistance experienced in the first part of the range of motion. Thus, setting a predetermined threshold limit may be a straightforward and reliable way of implementing a controller that limits the current supplied to the motor so that the speed of the actuator body reduces at it approaches the end position. It may be that the predetermined threshold is more than 10 percent, for example more than 20 percent, for example more than 50 percent higher than the current required to drive the motor at the first target speed in the absence of the additional mechanical resistance experienced in the first part of the range of motion. It may be that the predetermined threshold is more than double, for example more than triple, the current required to drive the motor at the first target speed in the absence of the additional mechanical resistance experienced in the first part of the range of motion. It may be that the controller is configured so that the first predetermined limit applies throughout the range of motion of the actuator body. Alternatively, it may be that the controller is configured so that the first predetermined limit applies after an initial period of movement in the first direction has elapsed. This may allow for a higher current to be supplied during an initial "spooling-up" period when the actuator body is accelerated by the motor from stationary. The initial period may be less than 10 percent, for example less than 5 percent of the time taken for the actuator body to cover the range of motion. For example the initial period may be less than one second. Alternatively, it may be that the controller is configured so that the first predetermined limit only applies when the actuator body in in the first part of its range of motion.

It may be that the controller is configured to limit the current supplied to the motor when the actuator body is in the first part of the range of motion by reducing the target speed of the motor to a second target speed, the second target speed being lower than the first target speed, and then to control the supply of current to drive the motor at the second target speed. It may be that the controller is configured such that the target speed is changed (reduced) to the second target speed when the current supplied to the motor exceeds a predetermined threshold and/or increases by a predetermined amount, for example when the current supplies experiencing a doubling or greater increase, e.g. a tripling. It may be that the controller is configured to reduce the target speed to the second target speed in dependence on the increase in current supplied to the motor as a result of the increased mechanical resistance. The second target speed may be less than 95%, for example less than 90%, for example less than 70%, for example less than 50% of the first target speed.

It may be that when the actuator body is in the end position a portion of the body and/or the drive mechanism abuts one or more end stops such that further movement of the actuator body in the first direction is prevented.

It may be that the actuator is an electro-mechanical actuator. It may be that the actuator is a linear actuator. It may be that the actuator body is an actuator arm, for example mounted for axial motion. Thus the range of motion may be an axial range of motion, for example of a distal end of the actuator arm. In that case, the distal end of the actuator arm may have a range of travel comprising a first region and a second region, the first region extending between the end position of the distal end and the second region. In that case, references to the range of motion and the first and second parts may be understood as references to the range of travel and the first and second regions. It may be that the end portion of the arm abuts an end stop when the actuator arm is in the end position.

It may be that the actuator is a rotary actuator. It may be that the actuator body is a shaft mounted for rotation about its longitudinal axis and/or a planar body mounted for rotation about its axis of symmetry. Thus the range of motion may be an angular range of motion. In that case, a point on the shaft or body may have a range of travel comprising a first region and a second region, the first region extending between the position occupied by said point when the body is in the end position and the second region. In that case, references to the range of motion and the first and second parts may be understood as references to the range of travel and the first and second regions. It may be that a portion of the shaft or body abuts an end stop when the actuator body is in the end position. In the case that the actuator is a rotary actuator, a torsion spring may be used to provide the additional mechanical resistance in the first part of the range of motion.

It may be that the actuator comprises a piston mounted on a rod for axial movement relative to the rod. It may be that the rod and piston are configured such that rotation of one of the rod and piston relative to the other causes axial motion of the piston relative to the rod. For example, the rod may be a threaded rod and the piston may be a nut, for example a lead nut or ball nut. It may be that one of the rod and piston is connected to the motor for rotation thereby and the other of the rod and piston is connected to the actuator body for movement therewith. It may said other of the rod and piston is prevent from rotating with said one of the rod and piston by its connection with the actuator body. Thus, it may be that rotation of said one of the rod and piston causes axial (or linear) movement of said other of the rod and piston (and the actuator connected thereto). This type of linear actuator will be well known to the person skilled in the art.

It may be that the actuator comprises one or more resilient members, for example one or more springs, configured to resist movement of the actuator body in the first direction when the actuator body is in the first part of the range of motion but not when the actuator body is in the second part of the range of motion. Thus, the additional mechanical resistance may be provided by the resilient member(s). It may be that the actuator is arranged such that the actuator body or a component to which it is connected (directly or indirectly) contacts and/or deforms (for example compresses or stretches) the resilient member(s) when the actuator body is in the first part of the range of motion but not in the second part. It may be that the spring(s) are helical or coil springs or torsion springs. A resilient member(s) may be a mechanical simple, cost effective, space efficient and/or reliable way of providing the additional mechanical resistance.

It may be that the torque required to rotate the rod relative to the piston is greater when the actuator body is in the first part of the range of motion than when the actuator body is in the second part of the range of motion. Thus, the additional mechanical resistance may be provided by the increasing the friction in the rod/piston mechanism in the first part of the range of motion. The shape (including the dimensions) of the thread via which the rod and piston interface when the actuator body is in the first part of the range of motion may differ from the shape of the thread via which the rod and piston interface when the actuator body is in the second part of the range of motion such that the torque required to rotate the rod relative to the piston is greater in the first part than in the second part. For example, the shape of the thread in a first region of the rod (being the region in which the piston is located when the actuator body is in the first part) may differ from the shape of the thread in a second region of the rod (being the region in which the piston is located when the actuator body is in the second part). Additionally or alternatively, the surface finish of the surface(s) via which the rod and piston interface when the actuator body is in the first part of the range of motion may differ from the surface finish via which the rod and piston interface when the actuator body is in the second part of the range of motion such that the torque required to rotate the rod relative to the piston is greater in the first part than in the second part. For example, the surface finish of the first region of the rod may differ from the surface finish of the rod in the second region of the rod. Increasing the torque required in the rod/piston mechanism may be a mechanically simple, cost effective, space efficient and/or reliable way of providing the additional mechanical resistance. Additionally or alternatively, increasing the torque required in the rod/piston mechanism may provide an additional level of control of the rate at which the mechanical resistance changes.

It may be that the actuator is configured such that friction between the actuator body and a brake portion of the actuator is greater when the actuator body is in the first part of the range of motion than in the second part. Thus, the increased mechanical resistance may be provided by friction between the actuator body and another part of the actuator. For example, it may be that the actuator body and a surface of the brake portion are shaped such that the friction between the actuator body and the surface is higher when the body is in the first part of the range of motion than in the second. For example the actuator body and/or the surface of the brake portion may be tapered and/or inclined such that the portion of the actuator body in contact with the surface is higher in the first part of the range of motion than in the second part. Additionally or alternatively, the shape and/or finish of the surface of the brake portion may differ between a first region (being the portion of the surface in contact with the actuator body in the first part of the range of motion) and a second region the portion of the surface in contact with the actuator body in the second part of the range of motion) so that the coefficient of friction is increased as between the first and second part of the range of motion. Increasing the friction between the actuator body and another part of the actuator may be a mechanically simple, cost effective, space efficient and/or reliable way of providing the additional mechanical resistance. Additionally or alternatively, increasing the friction between the actuator body and another part of the actuator may provide an additional level of control of the rate at which the mechanical resistance changes.

The actuator may comprise a housing. The motor may be located within the housing. The actuator body may be located at least partially within the housing. The actuator body may be mounted for movement relative to the housing. The controller may be located within the housing or outside the housing. The controller may be connected to the motor via one or more electrical connections. The controller may be configured to receive a control signal, for example from a user and/or the control system of an aircraft, and in dependence on the control signal so received, to move the actuator in the first direction to the end position.

The end position may be a first end position. It may be that the actuator body is mounted for movement in a second direction, opposite to the first direction, from the first end position to a second end position. It may be that the actuator body is mounted for movement over a range of motion between the first end position and the second end position. It may be that the range of motion comprises a third part. The third part being the range of motion extending between the second end position and the second part. It may be that the actuator is configured such that the mechanical resistance to movement of the actuator body in the second direction is higher in the third part of the range of motion than in the second part of the range of motion. It may be that the controller is configured such that the additional current supplied to the motor when subject to said higher mechanical resistance is limited such that the speed of the actuator body reduces as the actuator body approaches the second end position. Said additional mechanical resistance may be provided using any of the mechanisms described above in connection with the first direction/first end position. Any feature described above with reference to the first direction and the (first) end position may apply equally to the second direction and the second end position.

The first and/or third part of the range of motion may extend over at least 5%, for example at least 10% of the range of motion. Where the range of motion is an axial range of motion (e.g. in a linear actuator) the first and/or third part may extend over at least 5%, for example at least 10% of the axial distance between the first and second end positions. The first and/or third part may extend over at least 1 cm, for example at least 5 cm in axial distance. Where the range of motion is an angular range of motion (e.g. in a rotary actuator) the first and/or third part may extend over at least 5%, for example at least 10%, of the angular range between the first and second ends. The first and/or third part may extend over at least 3 degrees, for example at least 5 degrees. It may be that the first part of the range of motion extends between the point at which the mechanical resistance to movement in the first direction begins to increase substantially and the (first) end position. It may be that the third part of the range of motion extends between the point at which the mechanical resistance to movement in the second direction begins to increase substantially and the second end position.

It may be that the actuator is configured such that the mechanical resistance to movement of the actuator body in the first direction is higher in the first part of the range of motion up to an including the end position than in the second part. It may be that the actuator is configured such that the mechanical resistance in the first direction is higher while the actuator body is spaced apart from the end-stop (if any). It may be that the mechanical resistance is at least 5%, for example at least 10%, for example at least 20%, for example at least 50% higher in the first part of the range of motion than in the second part of the range of motion.

The controller may comprise software and/or hardware configured to control the supply of current to the motor in accordance with the invention as described above. The actuator may be configured for connection to an electrical supply, for example via the controller.

According to a second aspect of the invention there is also provided an aircraft landing gear assembly comprising an actuator as described in connection with any other aspect of the invention. The actuator may be mounted on the landing gear and/or connected to the landing gear. It may be the the actuator is configured to move a landing gear component, for example a landing gear leg or linkage, from a first position to a second position relative to the rest of the landing gear assembly. It may be that the actuator is configured to move the landing gear assembly between an extended configuration (for use in landing and taxiing) and a retracted configuration (for use during cruise).

According to a third aspect of the invention there is also provided an aircraft comprising an actuator as described in connection with any other aspect of the invention. The actuator may be mounted on the aircraft, for example on the aircraft, to move one or more flight surfaces between a first and second position to open and/or close one or more cargo bay doors; or to vary the position of one or more rotating surfaces. Thus the actuator, for example the actuator body, may be connected to the flight surface (s), cargo bay doors; or rotating surfaces. The flight surface(s) may comprise spoilers, flaps, ailerons and/or slats. The rotating surfaces may comprise rotor blades. The actuator, for example the housing may be mounted on the rest of the aircraft, for example on the airframe. It may be that the aircraft includes a landing gear assembly in accordance with the second aspect.

It may be that the aircraft is fixed-wing aircraft, for example a commercial fixed-wing passenger aircraft capable of carrying more than fifty passengers, for example more than one hundred passengers. It may be that the aircraft is a helicopter, drone or spacecraft.

In a fourth aspect of the invention, there is provided a method of operating an actuator, the actuator comprising a motor configured to move an actuator body. It may be that during normal operations, the actuator moves between a first end position and a second end position thereby defining a range of motion. The range of motion comprising a first part and a second part, the first part extending between the second part and the first end position of the body. It may be that during movement of the actuator in a first direction to the first end position the controller controls the supply of current to the motor to drive the motor at a first target speed in the second part of the range of motion. It may be that, subsequently, when the actuator body reaches the first part of the range of motion, the mechanical resistance to continued movement of the actuator body in the first direction increases. It may be that the controller limits the additional current supplied so that the speed of the actuator body in the first direction reduces in the first part of the range of motion. It may be that the increase is mechanical resistance causes the controller to supply additional current to the motor when the actuator body is in the first part of the range of motion. It may be that the additional current so supplied is limited thereby causing the speed of the actuator body to reduce as the actuator body approaches the end position. It may be that no additional current is supplied when the actuator body is in the first part of the range of motion, so that the speed of the actuator body in the first direction reduces in the first part of the range of motion.

The actuator of the method of the fourth aspect may have any features of the actuator described above in connection with the first to third aspects.

It may be that the controller continues to supply current to the motor until the actuator body reaches the end position. It may be that the additional current supplied is sufficient to move the actuator body against the additional mechanical resistance in the first part of the range of motion.

It may be that the controller limits the additional current supplied by maintaining the total current supplied below a predetermined threshold.

It may be that the controller limits the additional current supplied by reducing the target speed of the motor from the first target speed to a second, lower, target speed.

In a fifth aspect of the invention, there is provided an electro-mechanical actuator comprising: an actuator arm mounted for movement in a first direction to an end position; a motor connected to the arm to drive the actuator arm; a controller configured to control the supply of electric current to the motor to achieve a target speed of the motor, and at least one resilient member which, in use, is deformed by movement of the actuator arm in the first direction as the actuator arm is approaching the end position; and wherein the controller is configured to limit the current supplied to the motor so that the speed of the actuator arm reduces when the actuator arm is deforming the resilient member.

It will of course be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1A:
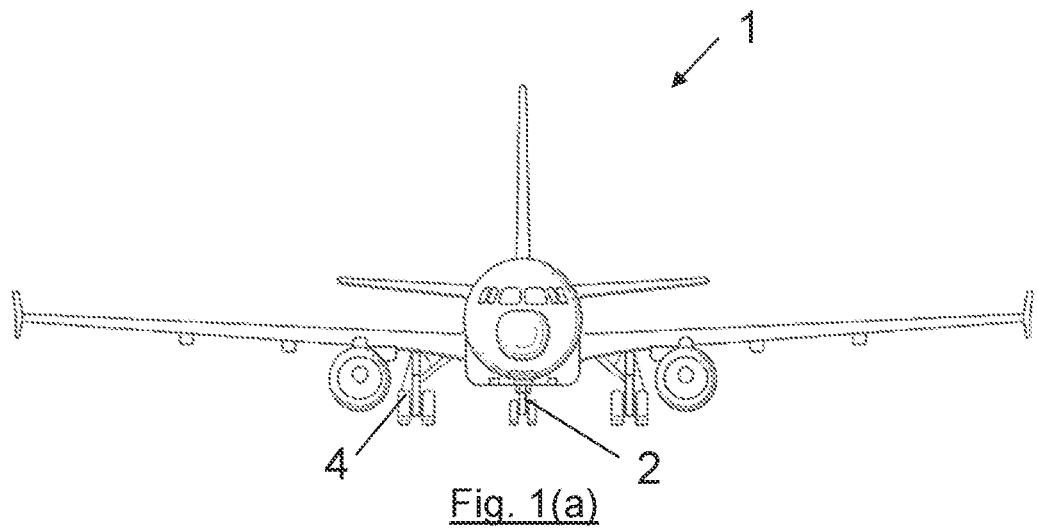
FIGS. 1 (a) and 1 (b) show a front and perspective view respectively of an aircraft including one or more actuators according to example embodiments of the invention.
Figure 1B:
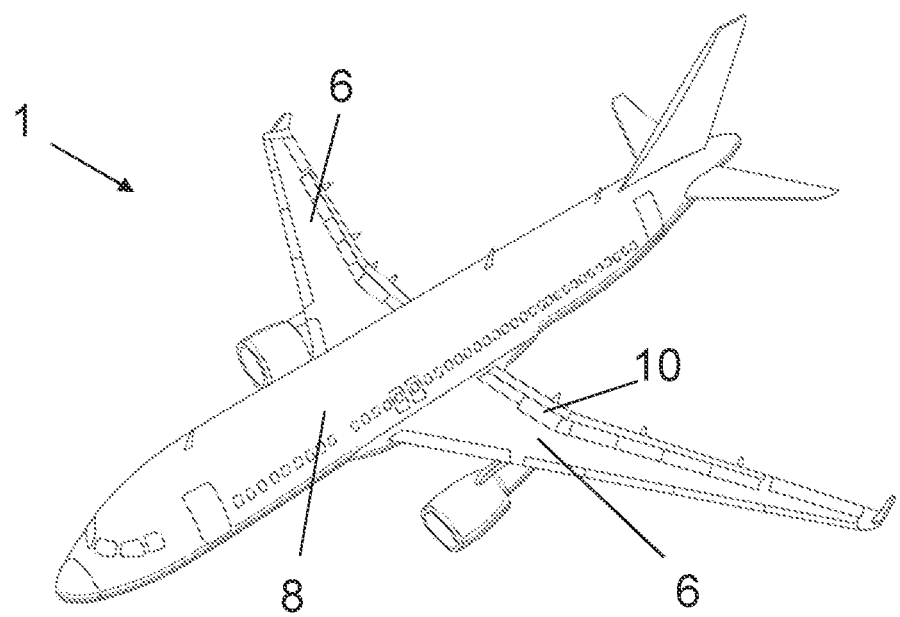

FIG. 1a shows a front view of an aircraft 1 comprising an actuator in accordance with embodiments of the invention. In FIG. 1(a) the aircraft 1 is on the ground with the nose landing gear (NLG) 2 and main landing gear 4 (MLG) extended. The configuration of the NLG 2 and MLG 4 is not shown in detail in FIG. 1 but will be well known to the skilled person. FIG. 1(b) shows a perspective view of the aircraft 1 in flight. Aircraft 1 comprises wings 6 mounted either side of a fuselage 8. The wings 6 each comprise various flight control surfaces 10, for example spoilers, flaps, ailerons and/or slats, which are not shown in detail in FIG. 1 but will be well known to the skilled person. While the present examples are described in the context of a fixed-wing aircraft it will be appreciated that the actuator of the present invention may also find application in a helicopter, drones and/or spacecraft.

FIGS. 2 (a) and (b) shows a schematic view of an actuator 12 in accordance with an example embodiment of the invention in a first position and a second position respectively. The actuator 12 is suitable for use in an aircraft. Actuator 12 includes a motor 14 connected to one end of a threaded rod 16 having a nut 18 mounted thereon. In some embodiments nut 18 may be a ball nut or lead screw. In some embodiments a gear unit (not shown) is connected between the motor 14 and threaded rod 16. The nut 18 is mounted within an actuator arm 20 with the threaded rod 16 and actuator arm 20 being arranged concentrically and coaxially, and the distal end of the threaded rod 16 being received within the actuator arm 20. The end region of the actuator arm closest to the motor 14 comprises a circumferentially extending flange 22. The motor 14 is located within a housing 24. At least part of the threaded rod 16 and the portion of the actuator arm 20 including flange 22 are located within the housing 24. A pair of springs 26 are mounted on housing 24, with one on either side of the actuator arm 20. Each spring 26 extends parallel to the longitudinal axis of the actuator arm 20 from the housing 24 towards the flange 22. A controller 28 is connected to motor 14 via electrical connections 30, indicated by dashed lines in FIG. 2. Controller 28 is shown outside housing 24 in FIG. 2, but it will be appreciated that in some embodiments controller 28 is contained within the housing.

Figure 2A:
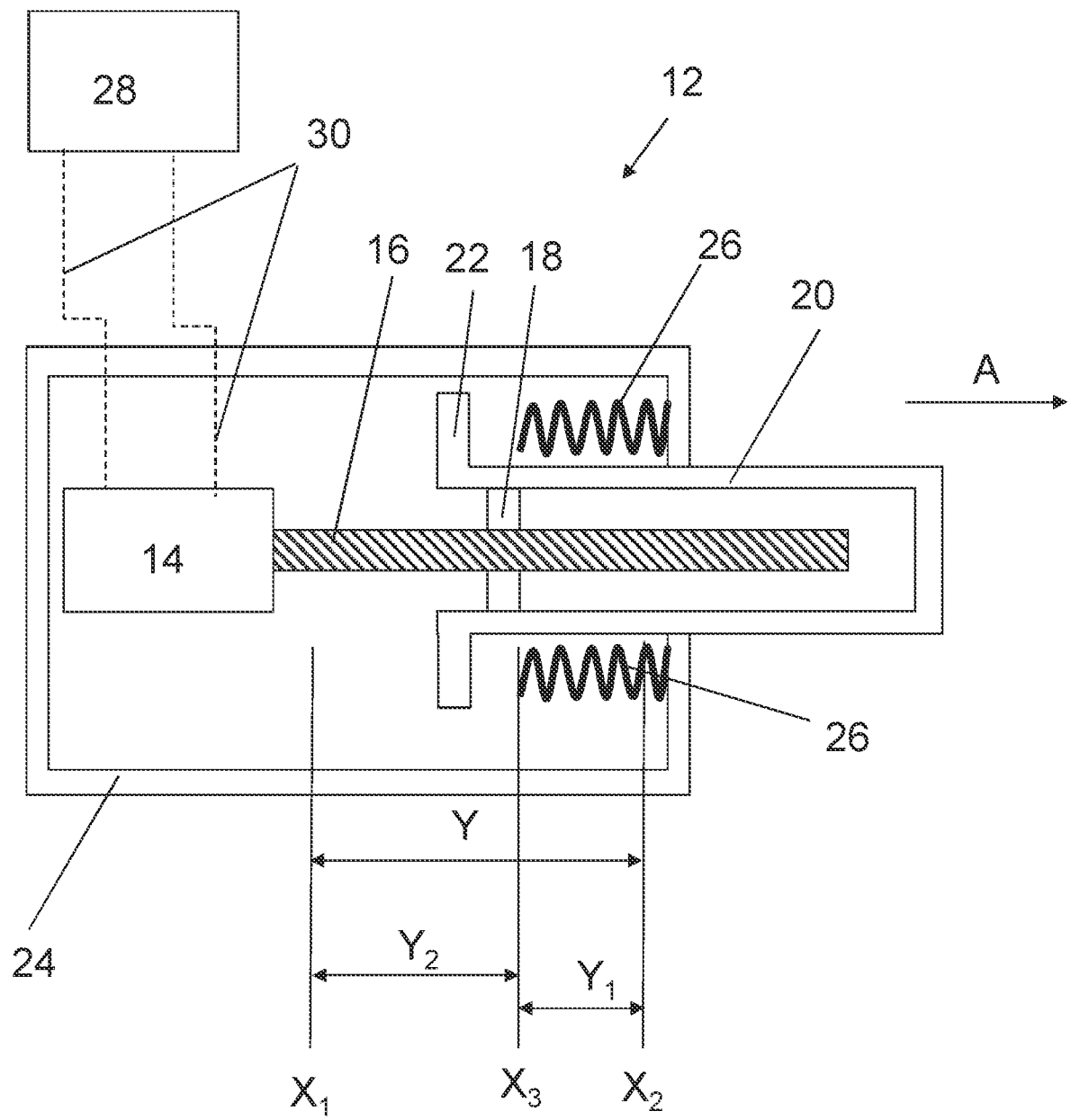
FIGS. 2 (a) and 2 (b) show a schematic view of an actuator according to an example embodiment of the invention in different positions.
Figure 2B:
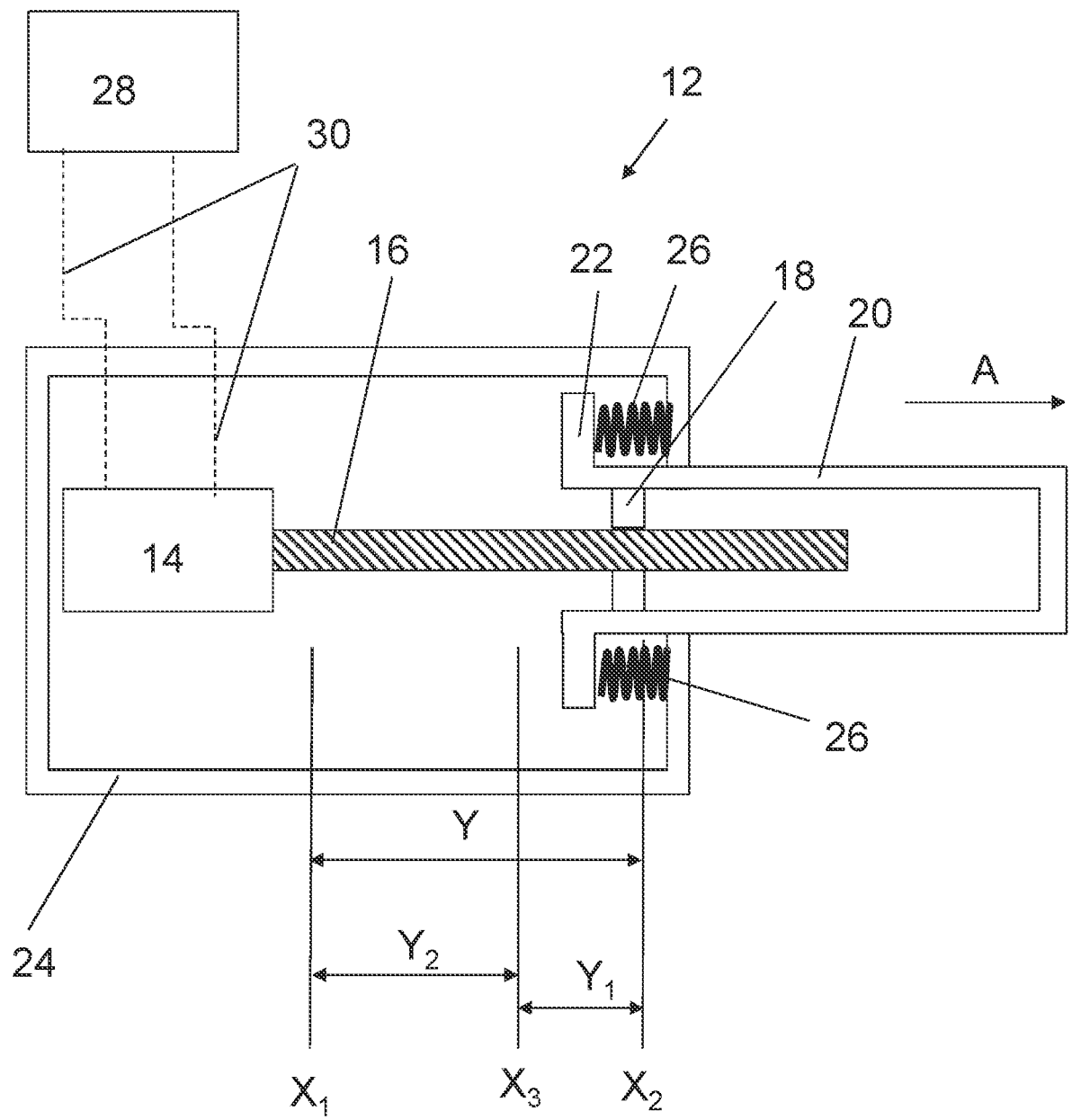

In FIG. 2 (a) the flange 22 is spaced apart from the distal end of each spring 26 (i.e. the end of the spring 26 that is not connected to the housing 24). In FIG. 2 (b) the actuator arm has been displaced relative to its position in FIG. 2(a) in a first direction A (to the right of FIG. 2). In FIG. 2(b) the flange 22 is in contact with the distal end of each spring 26 and the springs 26 have been compressed relative to their length in FIG. 2 (a).

In use, controller 28 supplies an electric current to motor 14 which rotates threaded rod 16. The connection between nut 18 and actuator arm 20 prevents nut 18 rotating with threaded rod 16 and consequently nut 18 moves along the thread of threaded rod 16 and actuator arm 20 moves with it. Thus, the rotational motion of motor 14 is converted into axial motion of actuator arm 20 in the conventional manner. In normal operation, actuator arm 20 moves in the first direction A and a second direction, opposite to A, between two end positions as the controller 28 causes the motor 14 to operate in a first or second direction. The position of the flange 22 in each of these end positions is labelled $X_1$ (the leftmost position) and $X_2$ (the rightmost position) in FIG. 2. The range of motion Y is shown in FIG. 2 as extending between point $X_1$ and $X_2$, but it will be appreciated that the range of motion can be defined as the range of motion of any point on the actuator. As actuator arm 20 moves in the first direction A (to the right in FIG. 2) away from $X_1$ and towards $X_2$ flange 22 is eventually brought into contact with and then compresses the springs 26. Thus, springs 26 resist continued movement of the actuator arm 20 in the first direction A once the flange 22 of actuator arm 20 passes beyond a point labelled $X_3$ in FIG. 2. The range of motion Y can therefore be divided conceptually into two regions: a first part $Y_1$ between $X_3$ and $X_2$ and a second part $Y_2$ between $X_1$ and $X_2$. In the first part of the range of motion Y, springs 26 provide mechanical resistance to movement of actuator arm 20 in the first direction A, while in the second part they do not.

Controller 28 is configured to adjust the current supplied to motor 14 in order to control the speed of the motor 14 to achieve a target speed of the motor $S_1$ and thereby move actuator arm 20 in the first direction A. The increased mechanical resistance provided in the first part $Y_1$ by springs 26 results in an increase in the torque on the motor 14 and so the current supplied to motor 14 is increased by controller 28 in order to maintain the speed of the motor 14. However, controlled 28 is configured to limit the current supplied to motor 14 to a predetermined threshold value, $I_{threshold}$, which is less than the level required to maintain the motor at the target speed $S_1$ against the additional resistance provided by springs 26. Thus, the additional resistance provided by springs 26 in combination with the limit on current implemented by controller 28 result in a slowing of actuator arm 20 in the first part $Y_1$ of the range of motion.

Figure 3:
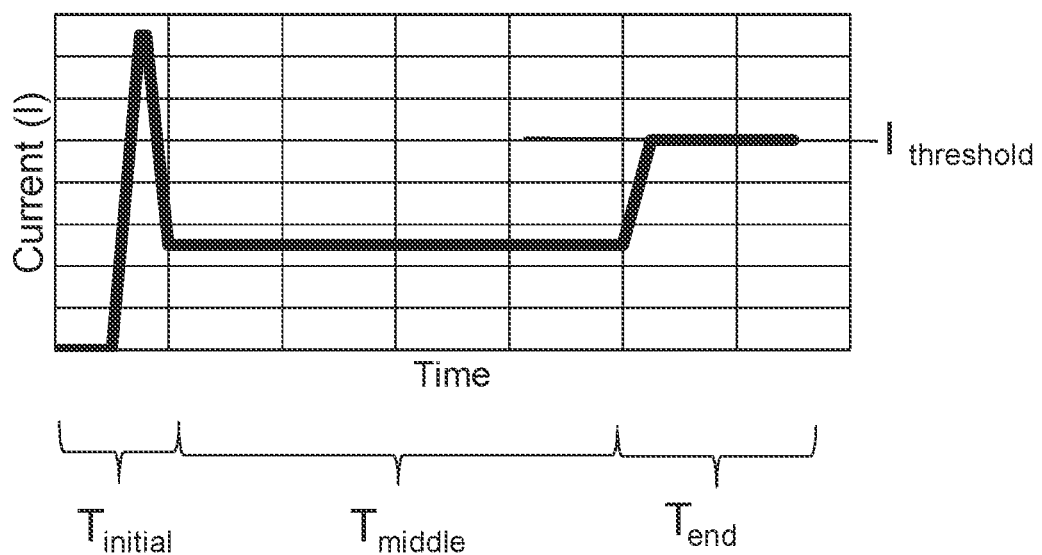
FIG. 3 shows a plot of current versus time for the actuator of FIG. 2 during use.

FIG. 3 shows a plot of current supplied to the actuator versus time for the actuator of FIG. 2 as the actuator arm 20 is moved from stationary at an initial position as shown in FIG. 2(a) to an end position where the flange 22 of the actuator arm 20 occupies the position $X_2$. During an initial time period ($T_{initial}$) the current spikes, before returning to a substantially constant level during a middle time period ($T_{middle}$) which is much longer than the initial time period, and then increasing again to a predetermined threshold ($I_{threshold}$) during an end time period ($T_{end}$). The peak current during the initial time period is higher than the predetermined threshold. The initial time period corresponds to the spooling up of the motor and actuator as the actuator is accelerated from stationary at the start of the movement. The middle time period corresponds to actuator travelling at substantially constant speed in the second part $Y_2$ of its range of motion. The end time period corresponds to the actuator travelling in the first part $Y_1$ of its range of motion where springs 26 resist the motion of the actuator. During the end time period, the current initially increases as controller 28 tries to maintain initial speed $S_1$ of the motor 14 until the predetermined threshold is reached, beyond which the controller 28 does not increase the current further. The predetermined threshold is set such that the current supplied to the motor 14 does not reach the level necessary to drive the motor at initial speed $S_1$ against the additional resistance of springs 26. Thus, in actuators in accordance with the present embodiment, actuator arm 20 slows as it approaches the end position of its normal range of motion and this is achieved without needing to sense the position of the actuator arm, thereby increasing the reliability of the damping and/or providing damping with a more cost effective and/or less complex actuator. In the present embodiment, controller 28 is configured to allow the current to exceed the predetermined threshold during spool up of the motor/actuator, but not while the actuator arm is approaching the end position. In other embodiments, it may be that the predetermined threshold is above the level required for spool up, such that the predetermined threshold applies at all points of the movement. In the present embodiment, controller 28 is configured to limit the current supplied to the motor in the first part and thereby cause a reduction in the speed of the actuator based on a threshold value of current, but it will be appreciated that controller 28 may be configured to implement the limitation of current in other ways. For example, in some embodiments, controller 28 may limited the current supplied to the motor in the first part by reducing the target speed of motor 14 to a lower value and then varying the current supplied to the motor to achieve that lower value.

The actuator described above uses springs 26 to provide the additional mechanical resistance in the first part $Y_1$ but it will be appreciated that the additional mechanical resistance may be provided in other ways. For example, in some embodiments the actuator may comprise other forms of resilient member, and/or the resilient members may be mounted in different locations from those shown in FIG. 2. In the same or yet further embodiments, other components may provide the mechanical resistance instead of or as well as resilient members. In some embodiments, threaded rod 16 and nut 18 may be configured such that the friction between the rod 16 and nut 18 is increased in the first part $Y_1$ as compared to the second part $Y_2$ for example by varying the shape of the thread as between the first and second parts or the surface finish of the thread as between the first and second parts.

The actuator above is a linear actuator using a threaded rod and nut, but it will be appreciated that in other embodiments, a different form of linear actuator may be used.

Figure 4A:
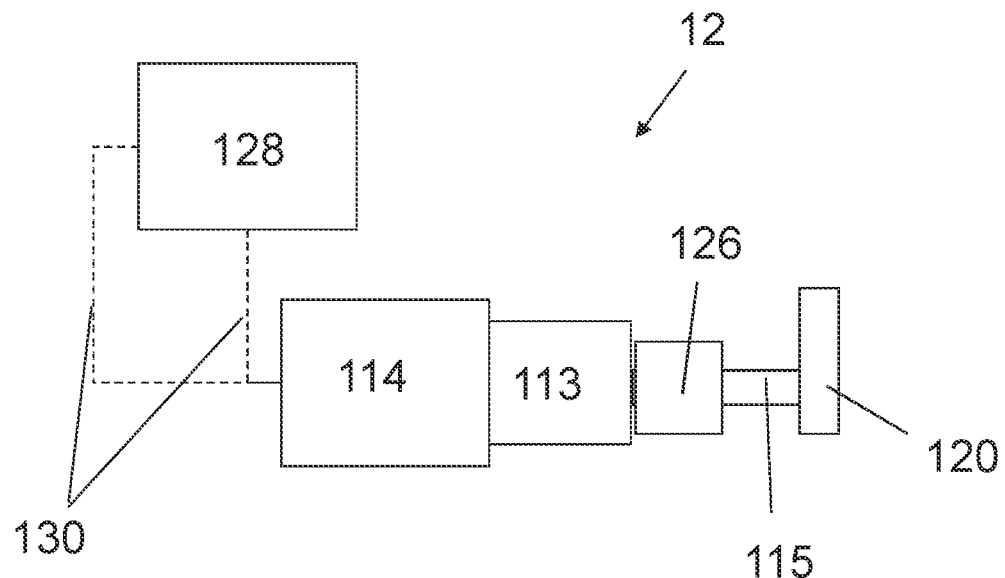
FIGS. 4(a) and 4(b) shows an actuator according to an example embodiment of the invention.
Figure 4B:
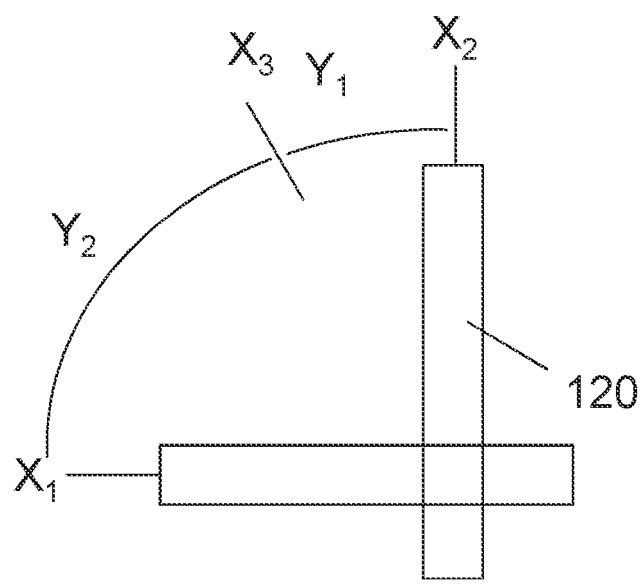

FIG. 4 (*a*) shows a side view of an actuator 112 in accordance with a second example embodiment of the invention. Only those aspects of the FIG. 4 embodiment which differ with respect to the FIG. 2 embodiment will be discussed here. Like elements as between FIG. 2 and FIG. 4 are designated in FIG. 4 with their reference numeral from FIGS. 2 incremented by 100 (e.g. motor 14 of FIG. 2 is labelled 114 in FIG. 4). In contrast to the actuator of FIG. 2, the actuator 112 of FIG. 4 is a rotary actuator. The actuator 112 comprises a motor 114 connected via gear assembly 113 and connector rod 115 to an actuator arm 120 that rotates in a plane perpendicular to the page. A torsion spring 126 is mounted around rod 115. FIG. 4(*b*) shows a front view of actuator arm 120 at the two extremes of its range of motion, labelled $X_1$ and $X_2$.

In normal operation, actuator arm 120 moves in the first direction A and a second direction, opposite to A, between the two end positions as the controller 28 causes the motor 114 to operate in a first or second direction. The rotational position of the arm 120 in each of these end positions is labelled $X_2$ (at 12 o'clock) and $X_1$ (at 9 o'clock) in FIG. 4(*a*). The rotational range of motion Y is shown in FIG. 4 as extending between point $X_1$ and $X_2$. As actuator arm 120 moves in the first direction A (anticlockwise in FIG. 4(*b*)) away from $X_1$ and towards $X_2$ a flange (not shown) on connecting rod 115 is eventually brought into contact with and then compresses the spring 126. Thus, torsion spring 126 resist continued movement of the actuator arm 120 in the first direction A once the connecting rod 115 passes beyond an angular position labelled $X_3$ in FIG. 4(*b*). Thus, the angular range of motion Y can be divided conceptually as for the linear actuator and the controller 128 can control the supply of current to the motor 114 in a similar manner as described above for the linear actuator. Again, it will be appreciated that in other embodiments the mechanical resistance may be provided by a different mechanism and/or a different arrangement of resilient members.

The actuators of FIG. 2 and/or FIG. 4 may be mounted on the aircraft of FIG. 1 in a conventional manner to move the NLG 4 or MLG 6 between the extended and retracted configurations, or to change the position of a flight control surface 10. The actuators of FIG. 2 and/or FIG. 4 may also be used on a helicopter, drone and/or spacecraft. For example, to move the landing gear of a helicopter between the extended and retracted configurations or to change the position of a rotating surface, e.g. a rotor blade.

Figure 5:
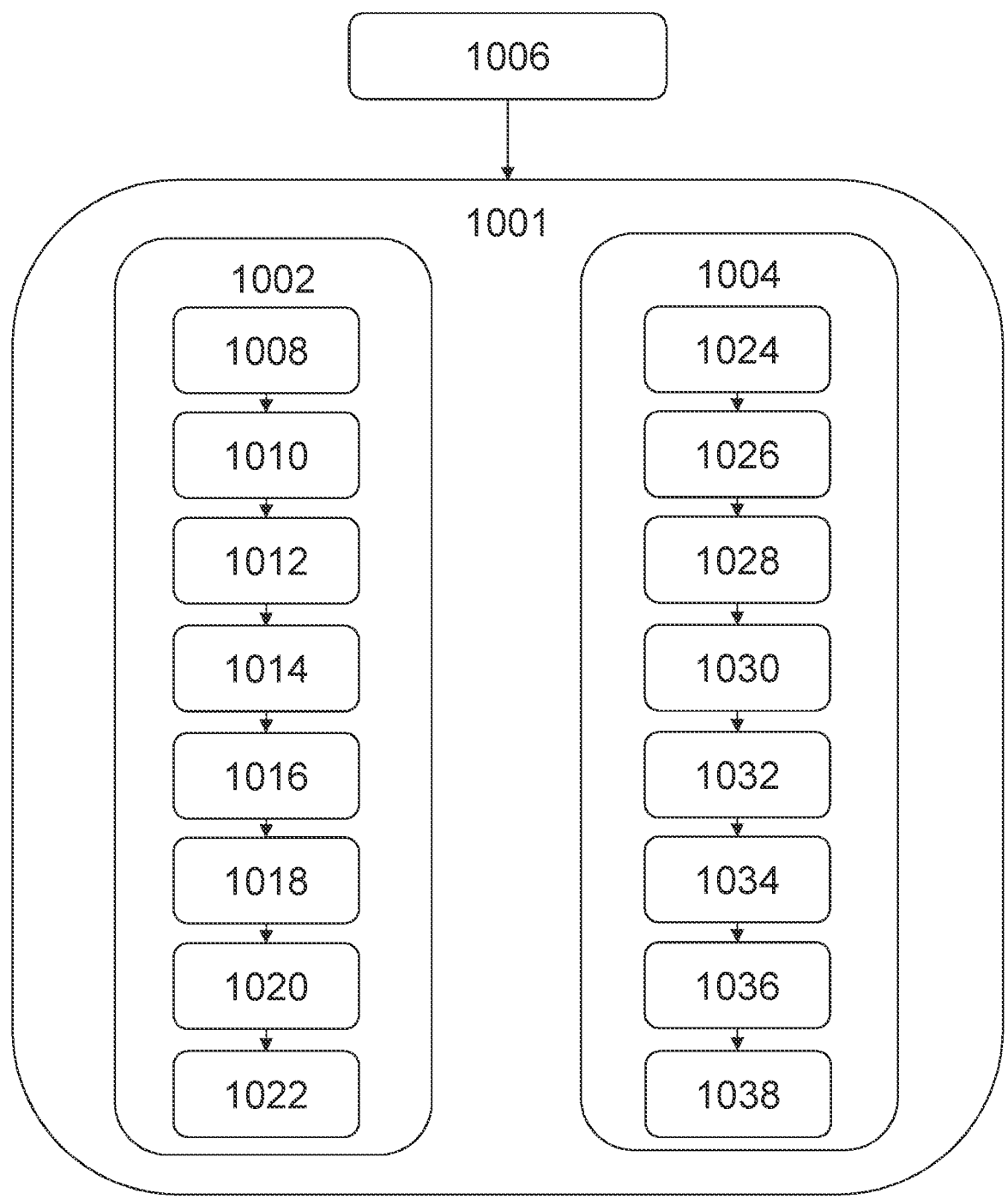
FIG. 5 shows a flow chart of an example method in accordance with the invention.

FIG. 5 shows a flow chart of an example method in accordance with the present invention, suitable for use with the actuators of FIG. 2 and/or FIG. 4. During normal operations, the actuator moves back and forth between two end positions. Each cycle of movement 1001 comprising a movement in a first direction 1002 to the first end position and movement in a second, opposite, direction 1004 to the second end position and is carried out after a control signal is received 1006 to initiate the movement. During the movement in the first direction 1002, the controller controls the supply of current to the motor to drive the motor at a first target speed 1008 in the second part of the range of motion. When the actuator body reaches 1010 the first part of the range of motion, the mechanical resistance to continued movement of the actuator body in the first direction increases 1012 causing the controller to supply additional current to the motor 1014. The controller limits 1016 the additional current supplied so that the speed of the actuator body in the first direction reduces 1018 in the first part of the range of motion. The actuator body continue to move in the first direction 1020 until it reaches the first end position 1022. Optionally, a similar damping process is repeated when the actuator body moves in the second direction 1004. During the movement in the second direction 1004, the controller controls the supply of current to the motor to drive the motor at a target speed 1024 in the second part of the range of motion. When the actuator body reaches 1026 the third part of the range of motion, the mechanical resistance to continued movement of the actuator body in the second direction increases 1028 causing the controller to supply additional current to the motor 1030. The controller limits 1032 the additional current supplied so that the speed of the actuator body in the second direction reduces 1034 in the third part of the range of motion. The actuator body continue to move in the second direction 1036 until it reaches the second end position 1038.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An electro-mechanical actuator, comprising:
   an actuator body, said actuator body is configured to be mounted for movement over a range of motion in a first direction to an end position, the range of motion comprising a first part and a second part, the first part having a range of motion extending between the end position and the second part;
   a motor coupled to the actuator body to move the actuator body in the first direction, the actuator body is connected to the motor by a drive mechanism that converts the rotation of the motor into motion of the actuator body in the first direction;
   wherein the actuator further comprises one or more sensors configured to measure a speed of the motor or a speed of a part of the drive mechanism;
   a controller configured to control a supply of current to drive the motor at a target speed, wherein the sensors are connected to the controller, and wherein the controller is configured to vary the supply of current to the motor in dependence on a signal so received to achieve the target speed;
   and wherein
   the actuator is configured such that a mechanical resistance to movement of the actuator body in the first direction is higher in the first part of the range of motion than in the second part of the range of motion, the mechanical resistance is a force acting against movement of the actuator body in the first direction, said force is provided by a mechanical interaction of elements of the actuator;
   wherein the increase in mechanical resistance in the first part of the range of motion gives rise to an additional torque on the motor requiring an additional current to be supplied to the motor if the speed of the motor is to be maintained, and the speed of the actuator body is proportional to the speed of the motor, so that by limiting the additional current supplied to the motor when experiencing the additional torque, the speed of the actuator body is reduced in a region of the end of the range of motion; and
   the controller is configured such that any additional current supplied to the motor when the actuator body is in the first part of the range of motion is limited thereby causing the speed of the actuator body to reduce as the actuator body approaches the end position.

2. The actuator to claim 1, wherein the controller is configured to limit the current supplied to the motor in the first part of the range of motion by maintaining the current supplied below a first predetermined limit.

3. The actuator according to claim 1, the controller is configured to limit the current supplied to the motor by reducing the target speed of the motor from a first target speed to a second, lower, target speed, and to then control the supply of current to the motor to drive the motor at the second target speed.

4. The actuator according to claim 1, wherein the actuator is a linear actuator.

5. The actuator according to claim 1, wherein the actuator comprises one or more resilient members configured to resist movement of the actuator body in the first direction when the actuator body is in the first part of the range of motion but not when the actuator body is in the second part of the range of motion.

6. The actuator according to claim 1, wherein the actuator comprises a rod and a piston mounted thereon, the rod and piston are configured such that rotation of one of the rod and piston relative to the other causes axial motion of the piston relative to the rod, and wherein a torque required to rotate the rod relative to the piston is greater when the actuator body is in the first part of the range of motion than when the actuator body is in the second part of the range of motion.

7. The actuator according to claim 1, wherein the actuator is configured such that friction between the actuator body and a brake portion of the actuator is greater when the actuator body is in the first part of the range of motion than in the second part.

8. An aircraft landing gear assembly comprising the actuator according to claim 1, wherein the actuator is configured to move the landing gear assembly between an extended configuration and a retracted configuration.

9. An aircraft comprising at least one actuator according to claim 1.

10. An aircraft according to claim 9, wherein the actuator is mounted on the aircraft to move one or more flight surfaces between a first and second position; to open and/or close one or more cargo bay doors; or to vary the position of one or more rotating surfaces.

11. A method of operating an electro-mechanical actuator, the actuator comprising a motor configured to move an actuator body, and a controller,
   wherein during operations, the actuator moves between a first end position and a second end position thereby defining a range of motion, the range of motion comprising a first part and a second part, the first part extending between the second part and the first end position of the body and during movement of the actuator in a first direction to the first end position;
   wherein the actuator body is connected to the motor by a drive mechanism that converts the rotation of the motor into motion of the actuator body in the first direction;
   the actuator comprises one or more sensors configured to measure a speed of the motor or a speed of a part of the drive mechanism, wherein the sensors are connected to the controller and the controller is configured to vary a current supplied to the motor in dependence on a signal so received in order to achieve a target speed of the motor;
   the controller controls a supply of current to the motor to drive the motor at a first target speed in the second part of the range of motion; and then,
   in the first part of the range of motion, a mechanical resistance to continued movement of the actuator body in the first direction increases, wherein the increase in the mechanical resistance causes the controller to supply an additional current to the motor; and
   the controller limits any additional current supplied to the motor when experiencing the additional torque, so that the speed of the actuator body in the first direction reduces in the first part of the range of motion.

12. The method according to claim 11, wherein the controller limits the additional current supplied by maintaining the total current supplied below a predetermined threshold.

13. The method according to claim 11, wherein the controller limits the additional current supplied by reducing the target speed of the motor from the first target speed to a second, lower, target speed.

14. An aircraft comprising the landing gear assembly in accordance with claim 8.

* * * * *